W. J. FRANCKE.
FLEXIBLE COUPLING.
APPLICATION FILED DEC. 2, 1920.
1,392,755.
Patented Oct. 4, 1921.
2 SHEETS—SHEET 2.
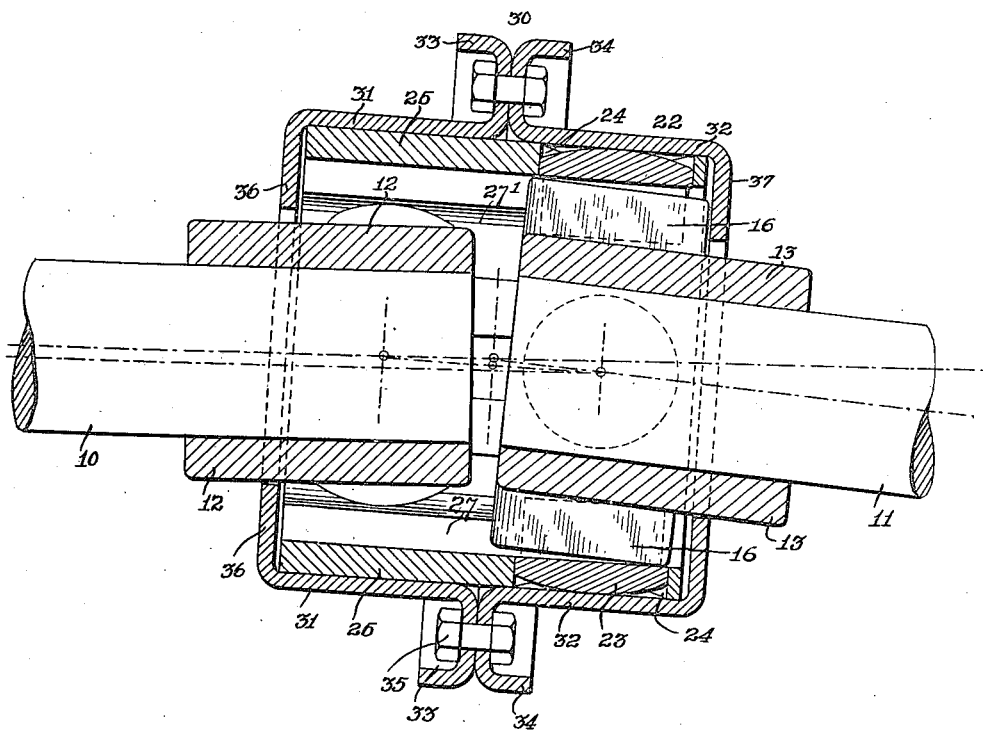
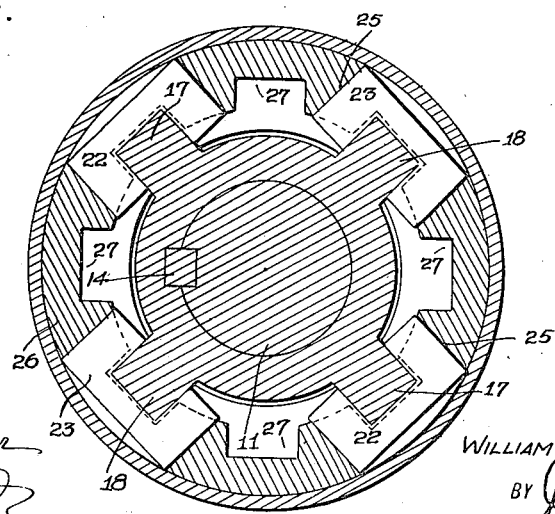
WITNESSES
INVENTOR
WILLIAM J. FRANCKE
BY
ATTORNEYS

UNITED STATES PATENT OFFICE.

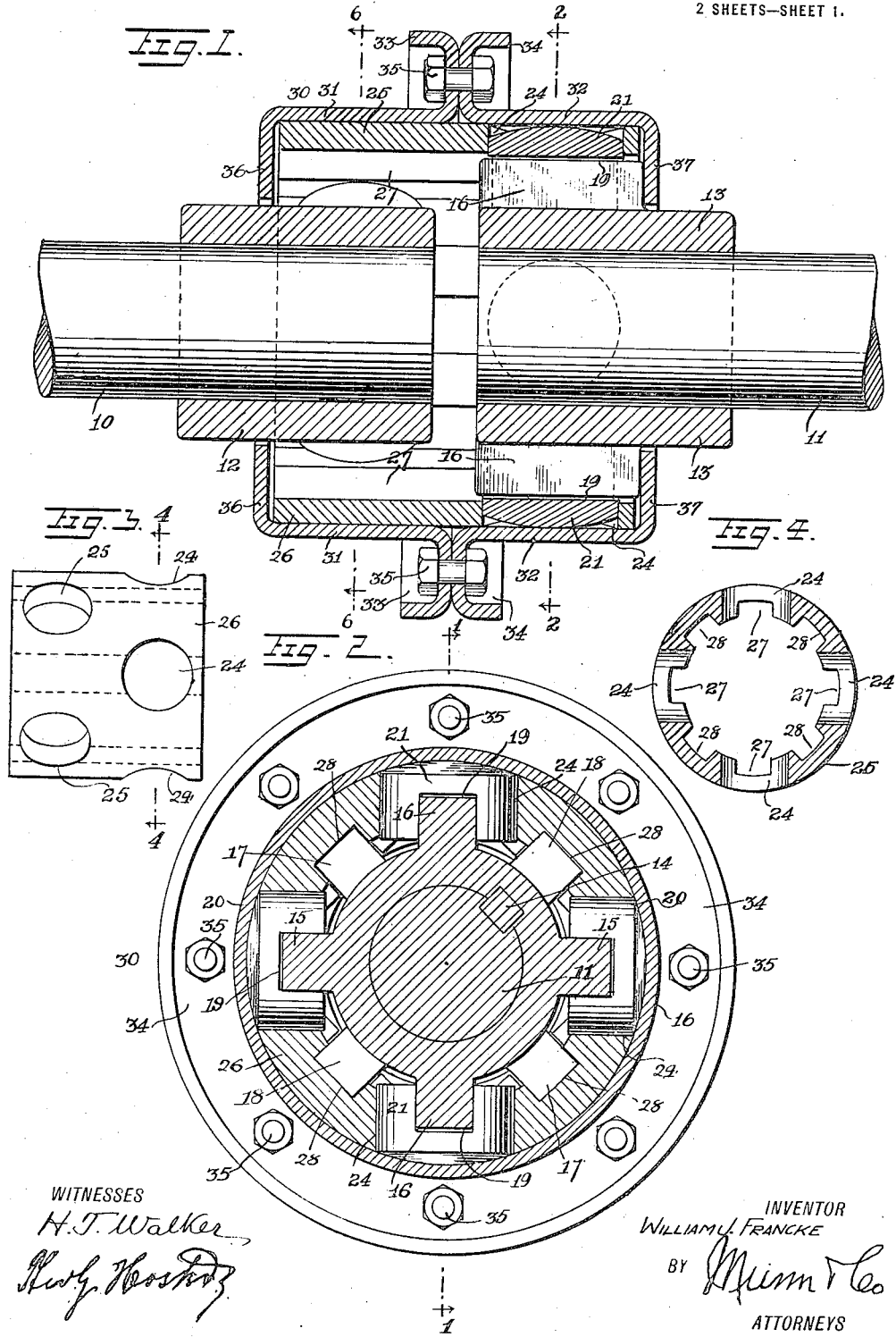

WILLIAM J. FRANCKE, OF HIGHLAND PARK, NEW JERSEY, ASSIGNOR TO THE FRANCKE CO., OF NEW BRUNSWICK, NEW JERSEY, A CORPORATION OF NEW JERSEY.

FLEXIBLE COUPLING.

1,392,755.      Specification of Letters Patent.      Patented Oct. 4, 1921.

Application filed December 2, 1920. Serial No. 427,741.

*To all whom it may concern:*

Be it known that I, WILLIAM J. FRANCKE, a citizen of the United States, and a resident of Highland Park, in the county of Middlesex and State of New Jersey, have invented a new and Improved Flexible Coupling, of which the following is a full, clear, and exact description.

The object of the invention is to provide a new and improved flexible coupling arranged to readily compensate for angular or parallel misalinement of a driving shaft and a driven shaft.

Another object is to reduce the error of transmission to within the limit of the thickness of the lubricating film between the working parts.

Another object is to provide a flexible coupling which is simple and durable in construction and composed of comparatively few parts, not liable to get easily out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a longitudinal central section of the improved flexible coupling and showing the driving shaft and driven shaft in alinement, the section being on the line 1—1 of Fig. 2;

Fig. 2 is a cross section of the same on the line 2—2 of Fig. 1;

Fig. 3 is a reduced plan view of the sleeve;

Fig. 4 is a cross section of the same on the line 4—4 of Fig. 3;

Fig. 5 is a longutudinal central section of the improved flexible coupling and showing the shafts in angular misalinement; and Fig. 6 is a cross section of the flexible coupling on the line 6—6 of Fig. 1.

The shafts 10 and 11, of which one is the driving shaft and the other the driven shaft, are provided at their adjacent ends with hubs or flanges 12 and 13 fastened in place by suitable fastening devices such as keys 14 (see Fig. 5). The hub 12 is provided with two sets of driving members 15, 15 and 16, 16, the driving members of each set being arranged diametrically opposite each other, and the driving members of the two sets being disposed at a right angle one to the other. The hub 13 is provided with two sets of driving members 17, 17 and 18, 18 arranged similarly to the sets of driving members 15, 15, and 16, 16 but staggered relative thereto, as will be readily seen by comparison of Figs. 2 and 6. The driving members 15, 15, 16, 16, 17, 17 and 18, 18 engage slots 19 formed in the inner faces of corresponding sets of connecting members, 20, 20, 21, 21, 22, 22 and 23, 23, preferably of disk shape, and fitting into sets of openings 24, 25 formed in a sleeve 26.

It will be noticed that when one of the shafts (say the shaft 10) is driven, then its rotary motion is transmitted to the shaft 11 by the hub 12, the driving members 15, 15 and 16, 16, the connecting members 20, 20 and 21, 21, the sleeve 26, the connecting members 22, 22, and 23, 23, the driving members 17, 17 and 18, 18 and the hub 13 fastened to the shaft 11. The inner face of the sleeve 26 is provided with slots or grooves 27, 28 in alinement with the sets of driving members 15, 15, 16, 16, and 17, 17, 18, 18 to permit the ends thereof to extend into the said slots 27, 28, it being understood that the driving members 15, 15, 16, 16, 17, 17 and 18, 18 are preferably somewhat longer than the diameters of the connecting members 20, 20, 21, 21, 22, 22 and 23, 23 to insure at all times a proper connection between the driving members and the connecting members whether the shafts are in or out of alinement.

Onto the sleeve 26 fits a housing 30, preferably made in two parts 31 and 32 having flanges 33 and 34 fastened together by bolts 35. The outer ends of the housing parts 31, 32 are provided with inwardly extending flanges 36, 37 fitting over the ends of the sleeve 26 to inclose the latter together with the inner ends of the hubs 12 and 13 and their driving members 15, 15, 16, 16, 17, 17 and 18, 18. The outer faces of the connecting members 20, 20, 21, 21, 22, 22 and 23, 23 are preferably made spherical and are engaged by the inner surface of the housing 30 to hold the said connecting members in place in the sleeve 26.

It is understood that by the use of, at least, two sets of driving members on each hub 12 and 13, and with the driving members of the two hubs 12 and 13 arranged in staggered relation, a uniform transmission of power from one shaft to the other is had. Although two sets of driving and connecting members are preferably used it is evident that I do not limit myself to this particular arrangement.

Parallel misalinement and angular misalinement are indicated in Fig. 5, and it will be noticed that the error of transmission is exceedingly small, that is, within the limit of the thickness of the lubricating film of the working parts. In an angular misalinement, say of 4° 24′ the angle with the sleeve 26 is 2° 12′, and, in this case, the Error=sec. to rad. 1 of half of the shafts $-1 \times$ rad.

Angle with sleeve $= \frac{4° 24'}{2} = 2° 12'$.

Sec. to rad. 1 of 2° 12′=1.0007.

$1.0007 - 1 \times R = .0007 \times 1.06 = .00007 =$ error.

Thus the error is practically negligible.

Having thus described my invention, I claim as new and desire to secure by Letters Patent:—

1. A flexible coupling, comprising a driving shaft, a driven shaft, hubs secured on the adjacent ends of the said shafts, radially projecting driving members rigid with the said hubs, the driving members on each hub being spaced equal distances apart and the driving members on one hub being staggered relative to the driving members on the other hub, a sleeve surrounding the hubs of the said shafts turnable connecting members mounted in the sleeve and engaged by the said driving members, and a housing fitting on the sleeve and holding the connecting members in place in said sleeve.

2. A flexible coupling, comprising a driving shaft, a driven shaft, hubs secured on the adjacent ends of the said shafts, at least four driving members arranged on each of the said hubs, the driving members on each hub being spaced equal distances apart and the driving members on one hub being staggered relative to the driving members on the other hub, a sleeve provided at its inner face with longitudinally extending grooves, and connecting members mounted to turn in the said sleeve and provided at their inner faces with grooves in register with the said sleeve grooves, the said driving members engaging the said grooves in the sleeve and the corresponding connecting members.

3. A flexible coupling, comprising a driving shaft, a driven shaft, hubs secured on the adjacent ends of the shafts, radially projecting driving members rigid with each hub, the driving members of one hub being staggered relatively to the driving members of the other hub, a sleeve provided with openings, and disk shaped connecting members in the openings of the sleeve and provided in their inner faces with slots engaged by the driving members.

4. A flexible coupling, comprising hubs adapted to be secured on the adjacent ends of driving and driven shafts, each of the hubs having driving members disposed diametrically opposite each other, the driving members of each hub being at right angles to each other and the driving members of one hub being in staggered relation to the driving members of the other hub, a sleeve, connecting members mounted to turn in the said sleeve and having their axes intersecting the axes of the said hubs, the said connecting members being provided at the inner faces with slots engaged by the said driving members, the said connecting members having outer spherical faces, and a housing fitting onto the said sleeve and engaging the said spherical faces of the connecting members, the said housing inclosing the said driving members.

WILLIAM J. FRANCKE.